UNITED STATES PATENT OFFICE.

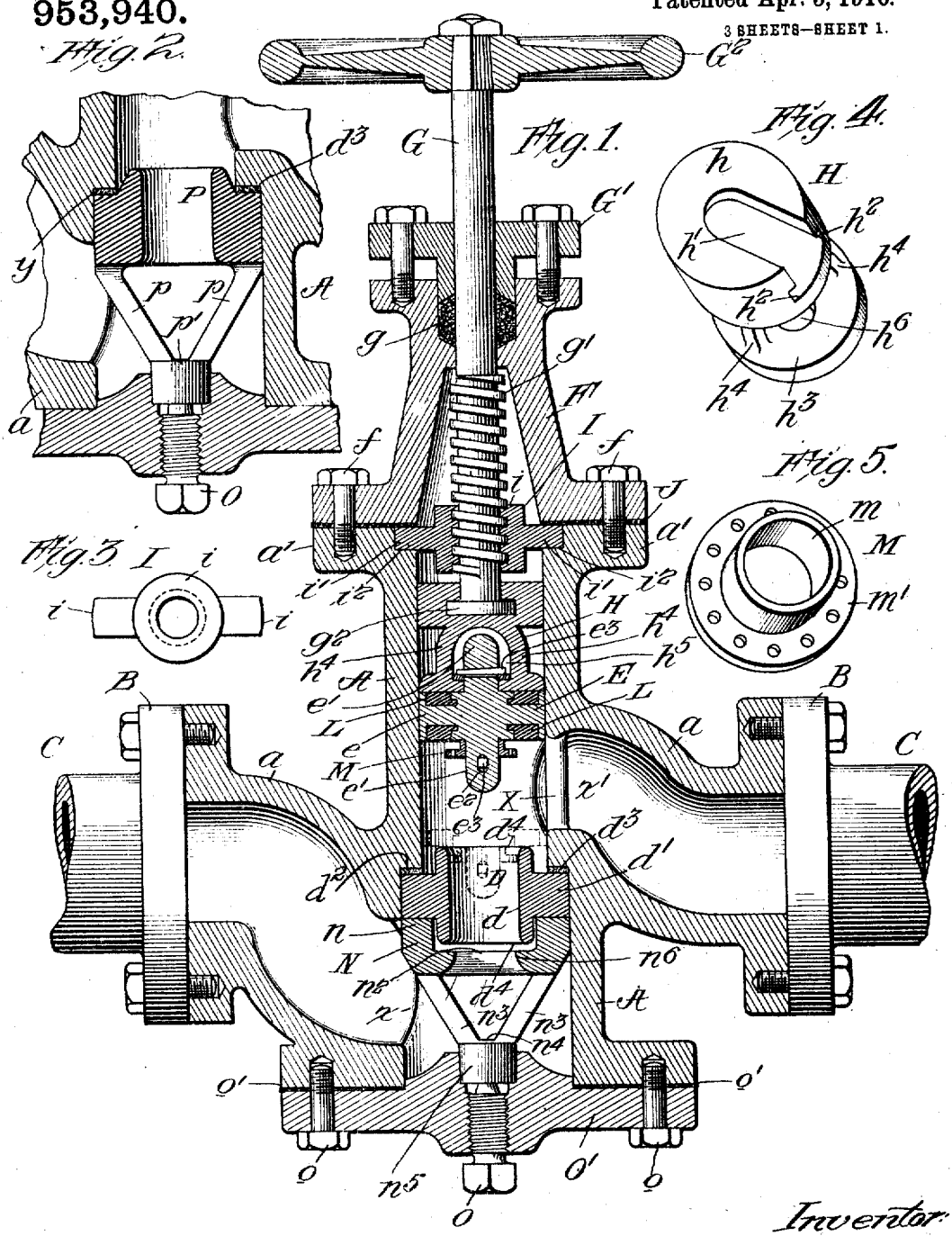

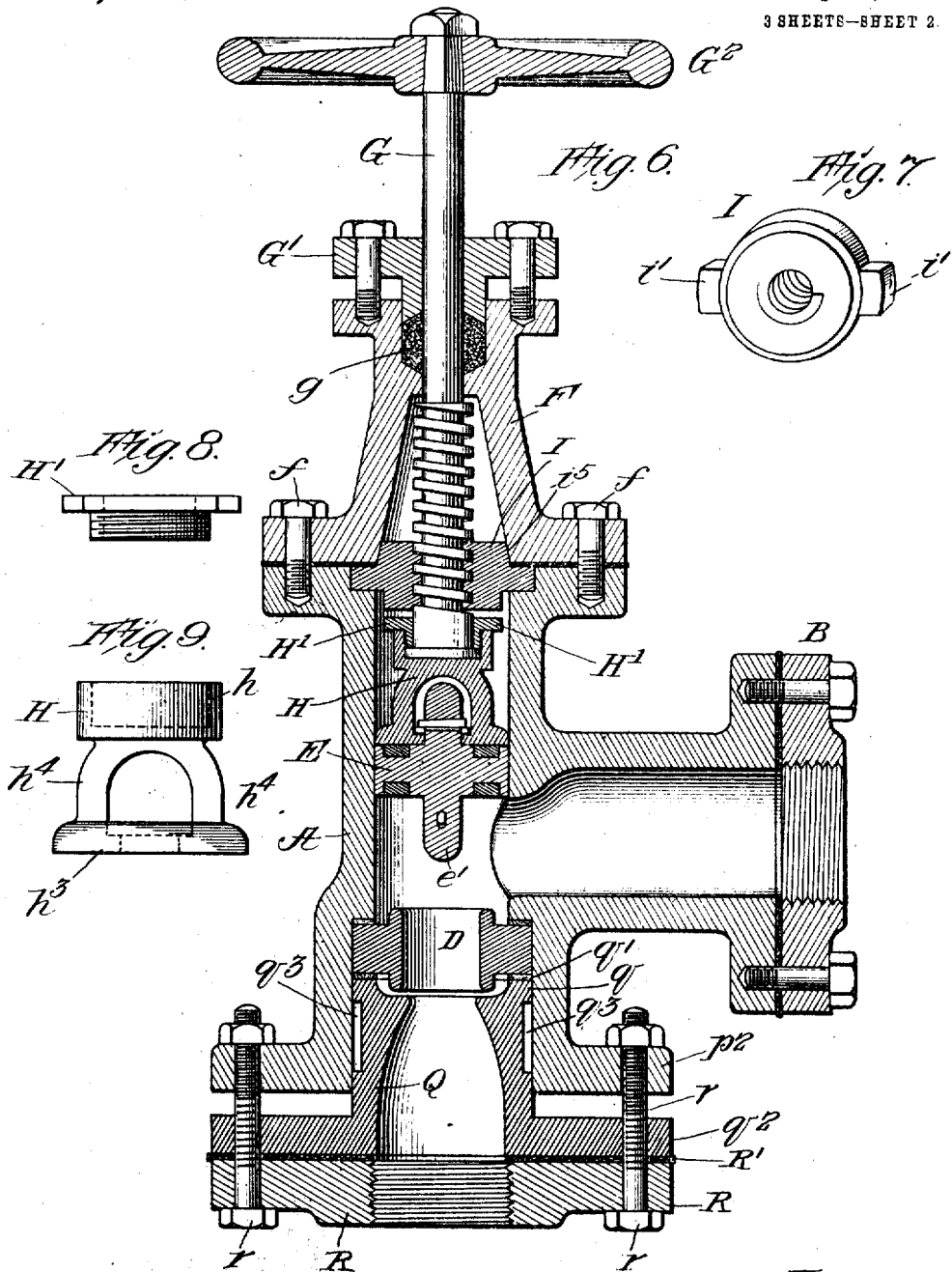

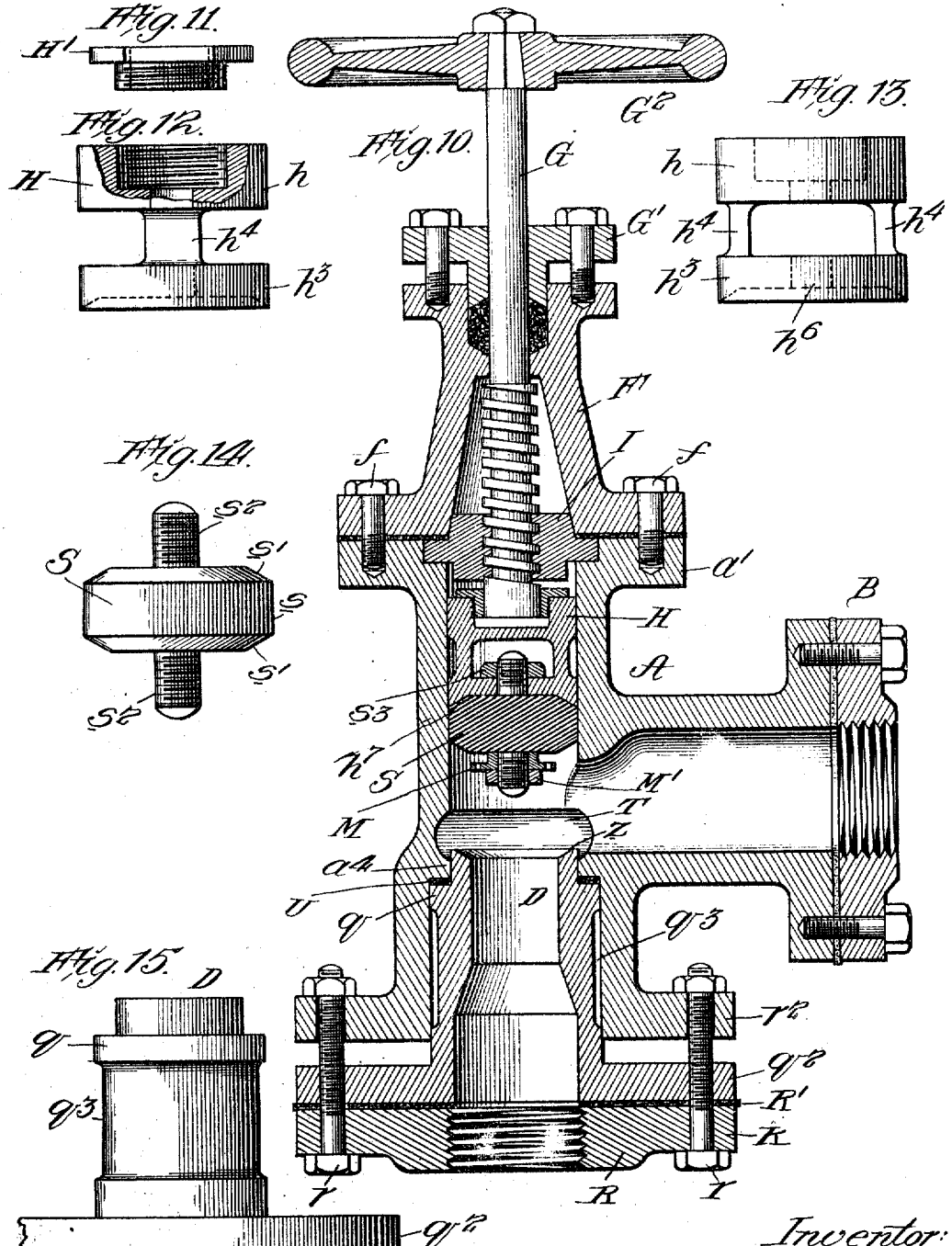

JACOB B. BEAM, OF PUNXSUTAWNEY, PENNSYLVANIA.

VALVE.

953,940.

Specification of Letters Patent.   Patented Apr. 5, 1910.

Application filed March 5, 1909. Serial No. 481,281.

*To all whom it may concern:*

Be it known that I, JACOB B. BEAM, a citizen of the United States, residing in Punxsutawney, in the county of Jefferson and State of Pennsylvania, have invented certain new and useful Improvements in Valves, of which the following is a specification.

My invention relates particularly to blow-off valves for steam boilers and the object of my invention is to so construct the valve mechanism that the valve-seat and valve may be readily removed for repairs, that the valve-seat and valve may be easily reversed to present new working surfaces, that the valve may be properly guided when in operation, and that the valve and valve-seat may be protected from injury due to scale or other hard substances passing from the boiler.

My improvements are embodied in the valve mechanism shown in the accompanying drawings, in which, Figure 1 shows a vertical section through valve mechanism with my improvements applied. Fig. 2 is a view on an enlarged scale of a modified form of valve-seat. Fig. 3 is a detail view in plan of the nut or bridge through which the threaded valve-system operates. Fig. 4 is a perspective view of the vertically sliding yoke which connects the valve with the valve stem. Fig. 5 is a perspective view of a shield applied to the valve. Fig. 6 shows a vertical central section through valve mechanism embodying my improvements in a modified form. In Fig. 1 a straight valve is shown, while in Fig. 6 the valve is of the angle type. Fig. 7 is a perspective view of the nut or bridge through which the threaded valve stem extends. Fig. 8 shows an elevation of the nut employed for connecting the valve stem with the yoke which carries the valve. Fig. 9 shows an elevation of said yoke. Fig. 10 shows a vertical central section through an angle valve with my improvements applied in a slightly modified form. Fig. 11 shows an elevation of the nut for connecting the valve stem with the yoke which carries the valve. Fig. 12 is a view partly in elevation and partly in section of the yoke carrying the valve. Fig. 13 shows an elevation of said yoke. Fig. 14 shows an elevation of the valve. Fig. 15 shows an elevation of the valve-seat shown in Fig. 10.

In Fig. 1 of the drawings I have shown my improvements applied to a straight line of piping and they may with but slight modification of some of the parts be applied to valves of various constructions.

The valve-casing A is provided with lateral branches $a$ which are connected by couplings B with the piping C. One of the branches $a$ opens into the vertical part of the valve-casing through an opening $x$ below the valve-seat D, while the opening $x'$ to the other branch $a$ is above the valve-seat. The opening at $x'$ is bridged by a vertically arranged webbing X which serves as a guide for the valve E and prevents it from moving sidewise into the opening $x'$. The upper portion of the valve-casing is flanged at $a'$, and to this flanged portion is attached a cap F by means of bolts $f$. The valve stem G extends down through the cap which is recessed and contains packing $g$ held in place by a gland G' of usual construction. The valve stem carries a hand wheel $G^2$ at its upper end and at its lower end it is connected with a yoke H to which the valve E is attached. The valve stem is threaded at $g'$ and this threaded portion extends through a nut or bridge I, shown in plan in Fig. 3, and which comprises a central cylindrical portion $i$ which is threaded to receive the threaded portion of the valve stem and laterally projecting arms $i'$ which enter recesses $i^2$ in the top of the valve-casing A, and are overlapped by the bottom of the cap F. Before the cap is placed on the valve-casing the nut or bridge I is placed in position and then the cap is applied and the screws are driven home to securely hold the cap in place and thus firmly secure the bridge or nut I. Packing J is preferably interposed between the bottom of the cap and the top of the flanged casing. The lower end of the valve stem is flanged at $g^2$ and is adapted to engage the upper part of the yoke H, shown in perspective in Fig. 4. The upper part $h$ of the yoke is circular in cross-section and is adapted to fit snugly the vertical bore of the valve-casing. It is also formed with a slot $h'$ which is undercut at $h^2$, thus adapting it to receive the flange $g^2$ of the valve stem. In connecting the yoke with the valve stem, the flanged portion of the stem is inserted into the openings $h'$, $h^2$ and slid sidewise until the axis of the valve stem coincides with the axis of the yoke. In this way the yoke and valve stem may be very quickly connected or disconnected and when once connected, in the manner stated, a sufficiently secure union is made between them for all operating purposes. The upper part $h$ of the yoke is connected with the lower part $h^3$ by arms $h^4$, there being a space $h^5$ between the arms, as clearly indicated in Fig. 1. The lower part $h^3$ is cylindrical in cross-section and fits the bore of the vertical part of the valve-casing. This yoke is for the purpose of supporting the valve E which is of novel construction. As shown it comprises a metallic spider $e$ having arms $e'$ projecting in opposite directions from the hub of the spider and formed with transverse openings $e^2$ to receive locking pins $e^3$. The arms are adapted to extend through a central opening $h^6$ in the lower portion $h^3$ of the yoke. In Fig. 1 the valve is shown as held in place on the yoke by the pin $e^3$.

A metallic composition, of suitable kind, L is placed in annular undercut grooves on opposite sides of the valved spider and these rings of metallic composition are adapted to contact with the edge of the valve-seat D.

The construction shown enables me to readily reverse the valve when one of the valve facings is worn or injured and thus present a new face.

On the lower arm of the valve is arranged a shield M comprising a central cylindrical portion $m$ and a laterally projecting flange $m'$ which is perforated vertically, as indicated. This shield may be held in place by a pin $e^3$. It serves to protect the metallic composition against injury by scale or other hard substances, which would otherwise injure the valve facing, but yet permits water to pass through the perforations in the flange $m'$ and keep the valve-facing clean. When the valve is lowered, in the manner indicated by dotted lines in Fig. 1, it will be seen that the shield enters the valve-seat and protects the face of the valve, in the manner just explained.

The valve-seat D is made reversible. It comprises a cylindrical central portion $d$ and a laterally projecting flange $d'$. This flange is received in an annular recess $d^2$ in the valve-casing and suitable packing $d^3$ is used to prevent leakage. The edges $d^4$ of the valve seat are adapted to engage the composition rings in the valve as before explained. The valve-seat is held in place by a cage N provided with an annular portion $n$ adapted to bear against the flange $d'$ and press it into its socket in the valve-casing. The yoke has a central opening $n^2$ through which water passes and it is provided with arms $n^3$ which converge at $n^4$ where they join a hub $n^5$ against which bears a set-screw O carried by a cap O' attached to the valve-casing by bolts $o$. Packing $o'$ is interposed between the cap O' and the lower flanged portion of the valve-casing. By means of the screw O the valve-seat may be held tightly in place. By loosening the screws $o$ and removing the cap O', the cage N may be withdrawn and the valve-seat taken out and reversed, or it may be taken out and replaced.

By the improvements described, it will be seen that both the valve and the valve-seat may be readily reversed so as to renew their contacting faces, or new valves, or new seats may be readily inserted.

It will be observed that there is a flange $n^6$ in the cage around the central opening $n^2$ therein which overlaps the adjacent edge of the valve-seat. This serves to protect the seat against injury by scale and other hard substances which would tend to cut it.

In Fig. 2 I have shown a slight modification. In this case the valve-seat and cage are combined, that is to say, the valve-seat P is formed with downwardly projecting arms $p$ converging to a hub $p'$ against which the set screw O bears. In other respects the arrangement is similar to that shown in Fig. 1. Packing $d^3$ is employed to prevent leakage. The valve-seat may be readily withdrawn and reground and then replaced. If necessary, the shoulder $y$ against which the valve seat is forced may be readily ground to compensate for the cutting away of the edge of the valve-seat.

In Fig. 6 much of the mechanism is similar to that shown in Fig. 1. The nut or bridge I is, however, in this instance, made to bear at $i^5$ against the tapered bore of the cap F and the lower end of the valve stem is connected with the yoke H by means of a screw-cap H'. The shield M is not shown in this figure of the drawings, but it can be readily applied. The yoke H is similar to that shown in Fig. 1 except that the upper portion $h$ is suitably shaped to receive the flanged end of the valve stem and the nut H'. This is clearly indicated in Fig. 6, and also in Figs. 8 and 9. The valve-seat D is similar to that shown in Fig. 1. The flange of the valve-seat is suitably packed, as indicated, and the seat is held in place by a follower Q, the upper flanged portion $q$ of which bears against the packing $q'$ and presses the valve-seat into its socket. In this instance my improvements are shown applied to an angle valve. The follower Q is provided with an annular flange $q^2$ which is connected with a coupling R by means of bolts $r$. Packing R' is interposed between the flange $q^2$ and the coupling R. The bolts $r$ pass through the lower flanged portion $r^2$ of the valve-casing A. By means of these devices the valve-seat may be very securely forced home and held in place, but by removing the bolts, the follower Q may be withdrawn and the valve-seat also withdrawn and reversed or repaired, or a new valve-seat may be inserted. The follower Q is formed with an annular recess $q^3$. This is for the purpose of catching scale or other hard substances that might possibly find their way in between the follower and the walls of the valve casing. This would tend to make the follower adhere to the casing and impede its ready withdrawal, but if scale does find its way past the packing $q'$, it will be caught in the recess $q^3$ and the withdrawal of the follower will not be impeded. In other respects the valve mechanism is similar to that shown in Fig. 1.

In Fig. 10 I have shown another way of applying my improvements to an angle valve. The valve stem passes through a cap F and through a bridge or nut I which are in every way similar to those shown in Fig. 6, and the valve stem is connected to a yoke H in the same manner as that shown in Fig. 6. The form of the yoke is slightly changed. The upper portion $h$ is connected to the lower portion $h^3$ by arms $h^4$ and the lower portion is formed with a recess $h^7$ shaped to receive the valve S which latter consists of a central portion $s$ beveled at $s'$ and provided with oppositely projecting arms $s^2$ which are threaded as shown. The lower portion $h^3$ of the yoke has a central opening $h^6$ through which the arms $s^2$ are adapted to pass. When one of the arms is inserted through the opening $h^6$ the valve is held in place by a nut $s^5$. A shield M, similar to that shown in Fig. 1, is applied to the lower arm of the valve. This may be held in place by a nut M'. The valve-seat D is formed with a beveled edge $z$ adapted to receive the beveled valve, and the valve-casing is formed with an annular recess T around the valve-seat, the edge of which projects above the lower edge of the recess T. The valve-seat is formed with an annular flange $q$ between which and the flange $a^4$ of the casing is interposed packing U. An annular recess $q^3$ similar to that shown in Fig. 6, is employed for a similar purpose and the other parts of the follower which carry the valve-seat are similar to those shown in Fig. 6.

In all cases the parts are so constructed that they may be easily assembled and taken apart, and such parts as need renewing may be readily renewed either by reversing the valve or valve-seat or both, by replacing them with new parts, or by regrinding or refacing such parts as need renewing.

I claim as my invention:

1. The combination of a valve casing having recesses in its upper end, a bridge having a central threaded portion and oppositely projecting arms arranged in said recesses of the valve casing, a cap detachably connected with the valve casing and serving to clamp the arms in said recesses, a yoke detachably connected with the spindle, and a reversible valve detachably connected with yoke.

2. The combination of a valve-casing, a yoke having an upper portion to which the valve spindle is connected, a lower portion and arms connecting the lower portion with the upper portion, a valve having upper and lower arms adapted to extend into the yoke between the arms, and means between the arms of the yoke for detachably connecting the valve to the yoke.

3. The combination of a valve-casing, a valve spindle, a bridge or nut rigidly connected with the casing through which the spindle extends, a yoke having a slotted upper portion which provides a laterally sliding connection with the valve spindle, and a reversible valve detachably connected with the yoke.

4. The combination of a valve casing, an annular valve seat, a valve, and a shield having perforations between its periphery and its central portion adapted to enter the annular valve seat.

5. The combination of an annular valve seat, a valve having a facing adapted to rest on the seat, and a shield carried by the valve having perforations between its periphery and its central portion.

6. The combination of a valve casing having a shouldered recess in its lower portion, an annular valve seat having a laterally projecting flange entering said recess below the shoulder, a follower connected with the valve seat and serving to press the flange thereof against said shoulder, a flange on the lower portion of the valve casing surrounding the recess therein, a flange on the follower, a coupling for connecting the follower with a pipe, and bolts detachably connecting the coupling, flanged follower and the flange on the valve casing.

7. The combination of a valve casing having an annular shoulder in its lower portion, an annular valve seat having a laterally projecting flange below said shoulder, a follower engaging said flange, a cap separable from the follower and detachably connected with the valve casing, and an adjusting screw, the threaded portion of which is arranged wholly within the cap and which engages the follower to force it with the flange of the valve seat toward the shoulder of the valve casing.

8. The combination of a valve casing having an annular shoulder in its lower portion, an annular valve seat having duplicate edges adapted to engage with the valve, and a follower having an inwardly projecting flange for shielding or protecting the edge of the valve seat when in reserve or not in operative relation with the valve.

9. The combination of a valve casing having an annular shoulder in its lower portion, a valve seat having an annular flange below said shoulder, a cap detachably connected with the lower portion of the valve casing, an adjusting screw, tne threaded portion of which is entirely below the inner face of the cap, and connections separable from the cap between the inner end of the screw and the valve seat whereby said valve seat may be pressed toward the shoulder of the valve casing.

10. The combination of a valve-casing, a valve spindle, a bridge through which the spindle extends, a yoke, means for detachably connecting the spindle with the yoke, a reversible valve detachably connected with the yoke, a shield for the valve detachably connected therewith, a valve-seat, a follower therefor provided with an annular recess to catch scale, and means for securing the follower to the valve-casing.

In testimony whereof, I have hereunto subscribed my name.

JACOB B. BEAM.

Witnesses:
CHARLES W. HUGHES,
MAYME C. GOLDEN.